US011966244B2

(12) United States Patent
Arai

(10) Patent No.: US 11,966,244 B2
(45) Date of Patent: Apr. 23, 2024

(54) POWER SUPPLY CIRCUIT WITH CASCADE-CONNECTED DIODES AND METHOD FOR CONTROLLING POWER SUPPLY CIRCUIT

(71) Applicant: NEC Corporation, Tokyo (JP)

(72) Inventor: Narihiro Arai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 337 days.

(21) Appl. No.: 17/430,536

(22) PCT Filed: Feb. 13, 2020

(86) PCT No.: PCT/JP2020/005429

§ 371 (c)(1),
(2) Date: Aug. 12, 2021

(87) PCT Pub. No.: WO2020/166636

PCT Pub. Date: Aug. 20, 2020

(65) Prior Publication Data

US 2022/0131460 A1 Apr. 28, 2022

(30) Foreign Application Priority Data

Feb. 15, 2019 (JP) ................................ 2019-025084

(51) Int. Cl.
*G05F 1/613* (2006.01)
*G05F 1/00* (2006.01)
*G05F 3/18* (2006.01)

(52) U.S. Cl.
CPC ................ *G05F 3/18* (2013.01); *G05F 1/613* (2013.01)

(58) Field of Classification Search
CPC ......... G05F 1/613; G05F 3/18; H02M 1/0009
See application file for complete search history.

(56) References Cited

U.S. PATENT DOCUMENTS 5,517,383 A * 5/1996 Webb .................. H04B 10/808 307/112
6,175,222 B1 * 1/2001 Adams ...................... G05F 1/46 323/273

(Continued)

FOREIGN PATENT DOCUMENTS

CN 102316625 A 1/2012
CN 103869869 A * 6/2014 ............ G05F 1/613

(Continued)

OTHER PUBLICATIONS

International Search Report for PCT Application No. PCT/JP2020/005429, mailed on Mar. 17, 2020.

(Continued)

*Primary Examiner* — Sisay G Tiku
(74) *Attorney, Agent, or Firm* — Sughrue Mion, PLLC

(57) ABSTRACT

An power supply circuit includes: a plurality of Zener diodes (ZD) between which cascade connection is established and which are connected in parallel to a load (10) to which power is supplied from a power supply line; switches (SW) on which ON/OFF control is performed, which are connected in parallel to one of the plurality of Zener diodes or between the plurality of Zener diodes, and which form current paths when ON control is performed on the switches; a current monitoring means (2) for monitoring current that is flowing in one of the plurality of Zener diodes; a comparison means (4) for comparing a reference current (3) and the current monitored by the current monitoring means; and a control means (5) for performing ON/OFF control on the switches on the basis of the result of the comparison by the comparison means.

10 Claims, 4 Drawing Sheets

(56) References Cited

U.S. PATENT DOCUMENTS

| | | | | |
|---|---|---|---|---|
| 6,222,350 | B1 * | 4/2001 | Mosley | G05F 1/56 323/231 |
| 6,713,991 | B1 | 3/2004 | McCallum | |
| 7,508,096 | B1 * | 3/2009 | Kumfer | H03K 17/13 307/140 |
| 2003/0063641 | A1 * | 4/2003 | Johnson | H01S 5/042 372/38.04 |
| 2004/0160127 | A1 * | 8/2004 | Willetts | H04B 3/44 307/31 |
| 2009/0028566 | A1 * | 1/2009 | Abbott | H04B 10/038 398/104 |
| 2011/0227413 | A1 * | 9/2011 | Tsai | H02J 1/10 307/43 |
| 2014/0077788 | A1 * | 3/2014 | Vemula | G05F 1/613 323/313 |
| 2016/0380423 | A1 * | 12/2016 | Gunnar | H02G 9/02 361/88 |
| 2019/0074690 | A1 * | 3/2019 | Arai | H02J 1/14 |
| 2020/0313762 | A1 * | 10/2020 | Ugajin | H04J 14/0212 |
| 2020/0403699 | A1 * | 12/2020 | Frisch | H04B 10/29 |
| 2022/0416538 | A1 * | 12/2022 | Arai | H04B 3/36 |

FOREIGN PATENT DOCUMENTS

| | | | | |
|---|---|---|---|---|
| CN | 103546049 | B * | 8/2016 | H02M 7/217 |
| CN | 108781093 | A | 11/2018 | |
| DE | 102015014588 | A1 * | 5/2017 | |
| EP | 3432481 | A1 * | 1/2019 | H02J 1/10 |
| JP | S54154038 | A | 12/1979 | |
| JP | H0583880 | A | 4/1993 | |
| JP | H1023754 | A | 1/1998 | |
| JP | 2011249790 | A | 12/2011 | |
| JP | 2017056854 | A | 3/2017 | |
| WO | 2017159648 | A1 | 9/2017 | |
| WO | WO-2017159648 | A1 * | 9/2017 | H02J 1/10 |
| WO | WO-2019171053 | A1 * | 9/2019 | H04B 10/29 |
| WO | WO-2021124789 | A1 * | 6/2021 | H02J 1/10 |

OTHER PUBLICATIONS

English translation of Written opinion for PCT Application No. PCT/JP2020/005429, mailed on Mar. 17, 2020.

Chinese Office Action for CN Application No. 202080011508.5 mailed on Apr. 7, 2022 with English Translation.

* cited by examiner

POWER SUPPLY CIRCUIT WITH CASCADE-CONNECTED DIODES AND METHOD FOR CONTROLLING POWER SUPPLY CIRCUIT

This application is a National Stage Entry of PCT/JP2020/005429 filed on Feb. 13, 2020, which claims priority from Japanese Patent Application 2019-025084 filed on Feb. 15, 2019, the contents of all of which are incorporated herein by reference, in their entirety.

TECHNICAL FIELD

The present invention relates to a power supply circuit, and a method for controlling a power supply circuit, and particularly, relates to a power supply circuit of submarine equipment, and a method for controlling a power supply circuit.

BACKGROUND ART

A submarine cable system is a system of which a total length including a land device existing on land and submarine equipment being laid undersea may become 10,000 km or more. The submarine cable system is incapable of transmitting constant voltage from a power feed device being on land to submarine equipment being undersea, and therefore, employs a power feed method that feeds current through a power supply cable. Herein, current fed from the power feed device being on land to the submarine equipment being undersea through the power supply cable is referred to as system current.

FIG. 4 is a circuit diagram illustrating a part of a power supply circuit in a background art. An inside of submarine equipment such as a submarine repeater includes a power supply load 100, and a configuration of cascade-connecting n Zener diodes ZD (ZD1 to ZDn) that are connected in parallel to the power supply load 100. The power supply circuit in FIG. 4 acquires constant voltage by utilizing breakdown voltage Vz resulting from a Zener effect when voltage is applied across a cathode and an anode of the Zener diode ZD. Since a multiplication result of the constant voltage thus acquired and the above-described system current is equivalent to power consumption inside the submarine equipment, selection of the number of the Zener diodes ZD (ZD1 to ZDn) to be cascade-connected according to power consumption is performed.

CITATION LIST

Patent Literature

[PTL1] International Publication No. WO2017/159648

SUMMARY OF INVENTION

Technical Problem

However, the above-described power supply circuit in the background art has the following problem. While distribution of consumption current inside submarine equipment and current passed to a Zener diode needs to be optimized for each system specification, the optimization of the distribution is difficult.

When all current of surplus power for a power feed ability determined by system current flows to a Zener diode ZD, this leads to excessive heat generation of the Zener diode ZD. The excessive heat generation of the Zener diode ZD causes a temperature rise inside the submarine equipment, and has an adverse impact on long-term reliability of a component. Thus, designing of a power supply circuit needs much effort, and leads to a cost increase.

Along with a trend of an open cable, a way of thinking that different equipment manufacturers contract a land section and a submarine section of a submarine cable system has rapidly spread. A submarine equipment manufacturer in such an age needs to quickly present an achievement solution for an optimum power supply circuit, and a submarine equipment manufacturer being slow in response has a risk of disappearing from the submarine cable system market.

Patent Literature 1 (PTL1) relates to a power feed method for submarine equipment, and suggests acquiring constant voltage by utilizing breakdown voltage resulting from a Zener effect when voltage is applied across an anode and a cathode of a Zener diode included in a power supply circuit. PTL1 suggests controlling a state of a switch by sensing attachment or detachment of a power supply load to or from submarine equipment, and thereby selecting a Zener diode group in which system current flows.

However, there is a problem that optimizing distribution of consumption current inside submarine equipment and current passed to a Zener diode for each system specification is difficult even when PTL1 is used.

An object of the present invention is to provide a power supply circuit and a method for controlling a power supply circuit which can automatically change, in relation to a load to which power is supplied from a power feed line, a circuit configuration according to consumption current of the load.

Solution to Problem

In order to achieve the above-described object, a power supply circuit according to the present invention includes: a plurality of cascade-connected Zener diodes being connected in parallel to a load to which power is supplied from a power feed line; a switch that is on/off-controlled, is connected between the plurality of Zener diodes or in parallel to one Zener diode among the plurality of Zener diodes, and forms a current path by being on-controlled; a current monitoring means for monitoring current flowing in one Zener diode among the plurality of Zener diodes; a comparison means for comparing reference current with the current monitored by the current monitoring means; and a control means for on/off-controlling the switch, based on a result of the comparison by the comparison means.

A method for controlling a power supply circuit according to the present invention is a method for controlling a power supply circuit including a plurality of cascade-connected Zener diodes being connected in parallel to a load to which power is supplied from a power feed line, and a switch that is on/off-controlled, is connected between the plurality of Zener diodes or in parallel to one Zener diode among the plurality of Zener diodes, and forms a current path by being on-controlled, the method including:

monitoring current flowing in one Zener diode among the plurality of Zener diodes; and comparing reference current with the monitored current, and on/off-controlling the switch, based on a result of the comparison.

Advantageous Effects of Invention

The present invention is able to automatically change, in relation to a load to which power is supplied from a power feed line, a circuit configuration according to consumption current of the load.

EXAMPLE EMBODIMENT

Preferred example embodiments of the present invention are described in detail with reference to the drawings.

First Example Embodiment

Figure 1:
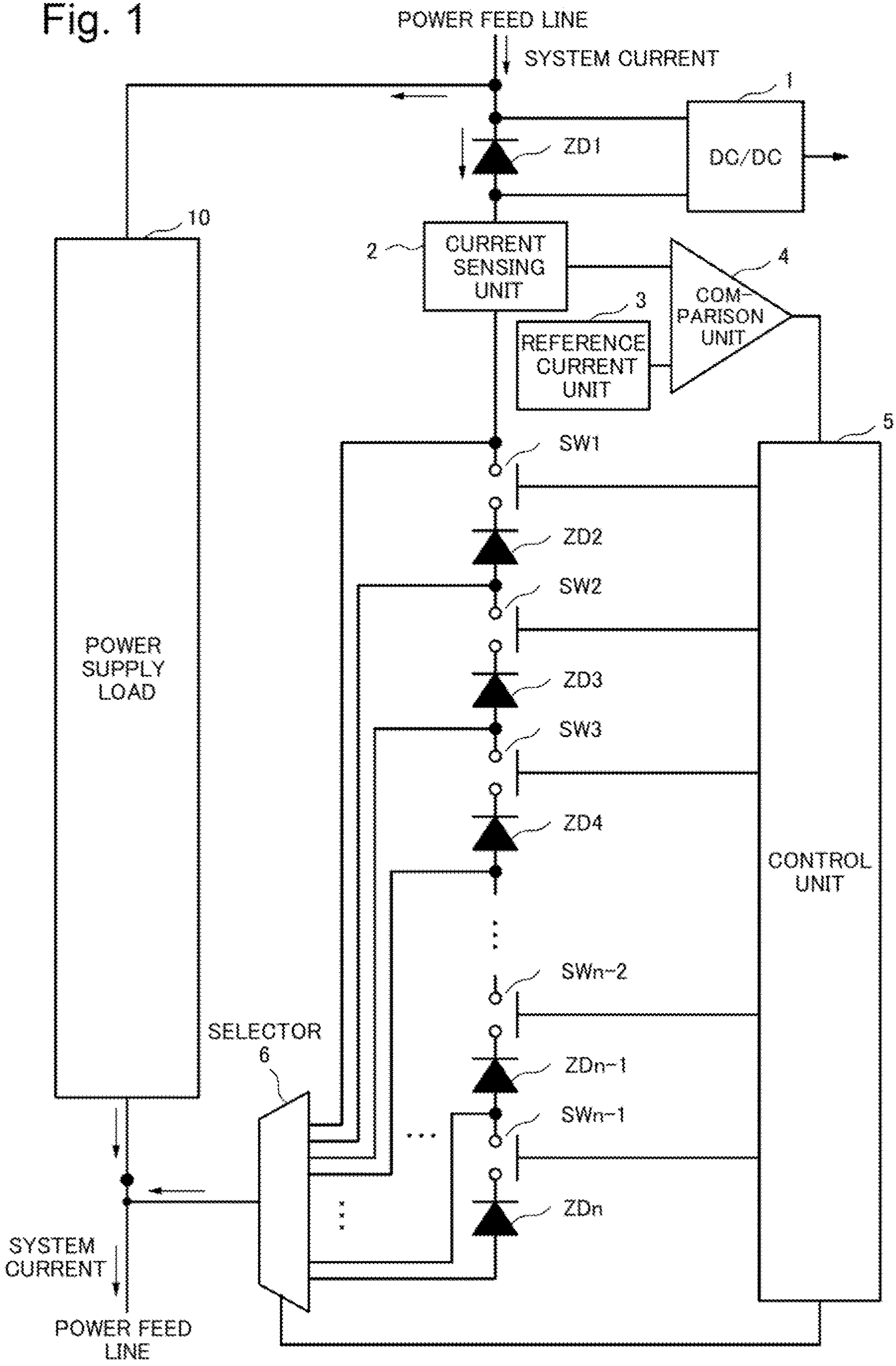
FIG. 1 is a circuit diagram of a power supply circuit according to a first example embodiment of the present invention.

First, a power supply circuit, and a method for controlling a power supply circuit according to a first example embodiment of the present invention are described. FIG. 1 is a circuit diagram of the power supply circuit according to the first example embodiment of the present invention.

(Description of Configuration)

The power supply circuit in FIG. 1 is a power supply circuit being connected in parallel to a power supply load 10 to which power is supplied from a power feed line. The power supply circuit in FIG. 1 includes a plurality of Zener diodes ZD (ZD1, ZD2, ZD3, ZD4, ZDn−1, and ZDn) that convert, into constant voltage, system current from the power feed line, and switches SW (SW1, SW2, SW3, . . . , SWn−2, and SWn−1) that are on/off-controlled. The plurality of Zener diodes ZD (ZD1, ZD2, ZD3, ZD4, . . . , ZDn−1, and ZDn) are cascade-connected. Herein, n is an integer of 2 or more, and is not limited to the number of the Zener diodes ZD specifically illustrated as element symbols in FIG. 1, or the number of the switches SW specifically illustrated as element symbols in FIG. 1.

Further, the power supply circuit in FIG. 1 includes a current sensing unit 2 as one example of a current monitoring means for monitoring current flowing in one Zener diode among the plurality of Zener diodes ZD, a reference current unit 3, and a comparison unit 4. The reference current unit 3 converts, into voltage, a current value which is required for the power supply circuit in FIG. 1 and at which the Zener diode ZD can maintain breakdown voltage resulting from a Zener effect, and outputs the voltage to the comparison unit 4 as a threshold value. The comparison unit 4 compares the current monitored by the current sensing unit 2 with the threshold value from the reference current unit 3, and controls a control unit 5 according to a comparison result.

The control unit 5 controls, based on the comparison result from the comparison unit 4, the switches SW (SW1 to SWn−1) in such a way as to switch the number of cascade-connections of the Zener diodes ZD, and controls a selector 6 in such a way as to switch a current path where system current flows synchronously with switching of the number of cascade-connections of the Zener diodes ZD.

In the power supply circuit in FIG. 1, the switches SW (SW1, SW2, SW3, . . . , SWn−2, and SWn−1) are connected between a plurality of Zener diodes, and form a current path by being on-controlled. In the present example embodiment, particularly, the switches SW (SW1, SW2, SW3, . . . , SWn−2, and SWn−1) are inserted between adjacent Zener diodes ZD of the plurality of cascade-connected Zener diodes ZD (ZD1, ZD2, ZD3, ZD4, . . . , ZDn−1, and ZDn). For example, the switch SW1 is inserted between the current sensing unit 2 and a cathode of the Zener diode ZD2, and a current path is formed between the current sensing unit 2 and the Zener diode ZD2 by controlling the switch SW1 on. The switch SW2 is inserted between the Zener diode ZD2 and the Zener diode ZD3, and a current path is formed between the Zener diode ZD2 and the Zener diode ZD3 by controlling the switch SW2 on. Similarly, the switch SWn−1 is inserted between the Zener diode ZDn−1 and the Zener diode ZDn, and a current path is formed between the Zener diode ZDn−1 and the Zener diode ZDn by controlling the switch SWn−1 on.

Further, the power supply circuit in FIG. 1 includes a DC/DC converter (direct-current/direct-current converter) 1. The DC/DC converter 1 generates voltage necessary for each component of submarine equipment, from breakdown voltage generated at both ends of the Zener diode ZD1 of the power feed line where system current flows.

In the power supply circuit in FIG. 1, n Zener diodes ZD are arranged in cascade in the power feed line where system current flows from a land power feed device. The power supply load 10, such as a control circuit of an optical amplifier and various function modules, is connected in parallel to the Zener diodes ZD.

In the power supply circuit in FIG. 1, a cathode of the Zener diode ZD2 is connected to the control unit 5 via the switch SW1, and an anode of the Zener diode ZD2 is connected to the control unit 5 via a cathode of the Zener diode ZD3 and the switch SW2. Similarly, a cathode of the Zener diode ZDn and an anode of the Zener diode ZDn−1 is connected to the control unit 5 via the switch SWn−1. The plurality of Zener diodes ZD1 to ZDn thus arranged in cascade are electrically isolated by the switches SW inserted therebetween. An anode side of each Zener diode ZD is connected to an input of the selector 6 that switches a path where system current flows. An output of the selector 6 is connected to the power supply load 10, and serves as a power feed line.

Power consumption W of the power supply load 10 is represented by a product of current I flowing in the power supply load 10 and voltage V given to the power supply load 10, and is constant unless there is some fluctuation in the power supply load 10. When the power consumption W of the power supply load 10 increases and the current I flowing in the power supply load 10 increases, current flowing to the Zener diode ZD decreases. When current flowing in the power supply load 10 is decreased, current flowing to the Zener diode ZD increases.

(Description of Operation)

Next, an operation of the power supply circuit in FIG. 1, and a method for controlling a power supply circuit are described. It is assumed that, in an initial state, the plurality of switches SW (SW1 to SWn−1) of the power supply circuit in FIG. 1 are off. Particularly, it is assumed that the switch SW1 being closest to the Zener diode ZD1 is off. For example, specification power supply voltage of the power supply load 10 is described below as being a plurality of times the breakdown voltage of the Zener diode ZD.

When system current is fed to the power supply circuit in FIG. 1 from a land power feed device, breakdown voltage is acquired at about several ten mA at both ends of the Zener diode ZD1. Based on the breakdown voltage, the DC/DC converter 1 generates voltage necessary for each component of submarine equipment. For example, the DC/DC converter 1 generates various kinds of voltage necessary for operations of the comparison unit 4, the control unit 5, and the selector 6 in FIG. 1. Constant voltage resulting from the breakdown voltage of the Zener diode ZD1 is given to the power supply load 10, and relevant current flows therein.

The system current not only flows to the Zener diode ZD1 but also flows to the power supply load 10 side. Due to the flow of the current to the power supply load 10 side as well, power consumption on the power supply load 10 side increases, and accordingly, current flowing to the Zener diode ZD side drops to a current that is unable to maintain the breakdown voltage of the Zener diode ZD. For example, when it is assumed that system current is 1 A, and minimum current that can maintain the breakdown voltage of the Zener diode ZD is 0.1 A, consumption current of the power supply load 10 can be permitted up to a maximum of 0.9 A. When consumption current on the power supply load 10 side becomes more than 0.9 A, a minimum current of 0.1 A that can maintain the breakdown voltage of the Zener diode ZD is deprived of, and this leads to a state of becoming unable to maintain the breakdown voltage of the Zener diode ZD. In order to cope with this, in the power supply circuit in FIG. 1, the comparison unit 4 compares voltage of the current sensing unit 2 with voltage of the reference current unit 3, and, when the voltage of the current sensing unit 2 becomes lower than the voltage of the reference current unit 3, the control unit 5 switches the switch SW1 from off to on, and switches the selector 6 in such a way as to form a power feed line with an anode side of the Zener diode ZD2 as a path. The voltage of the reference current unit 3 avoids becoming unable to maintain the breakdown voltage, with a threshold value being current slightly higher than a current that is unable to maintain the breakdown voltage of the Zener diode ZD. When the number of cascades of the Zener diodes ZD is switched to two, the power supply load 10 is given constant voltage resulting from breakdown voltage being associated with the number of cascades of the Zener diodes ZD, and current flows to the power supply load 10 side. Due to the flow of the current to the power supply load 10 side as well, power consumption on the power supply load 10 side increases, and accordingly, current flowing to the Zener diode ZD side drops to a current that is unable to maintain the breakdown voltage of the Zener diode ZD. In order to cope with this, the switch SW2 is further switched from off to on, and the selector 6 is switched in such a way as to form a power feed line with an anode side of the Zener diode ZD3 as a path.

In this way, changing the number of cascades of the Zener diodes ZD and switching a path of a power feed line is repeated until voltage of the current sensing unit 2 becomes higher than voltage of the reference current unit 3.

Description of Advantageous Effect

According to the present example embodiment, in submarine equipment constituting a submarine cable system, a configuration of a power supply circuit inside the submarine equipment can be automatically changed according to internal power consumption of the submarine equipment. Monitoring is performed in such a way that current flowing in cascade-connected Zener diodes ZD of the power supply circuit does not drop to current that is unable to maintain breakdown voltage of the Zener diode ZD, and a current path is changed in such a way that the number of cascades of the Zener diodes ZD to be cascade-connected becomes a changed number, based on a monitoring result. This can solve such a problem that current of surplus power for a power feed ability all flows to the Zener diode ZD, and leads to excessive heat generation of the Zener diode ZD.

More specifically, the present example embodiment provides the following advantageous effects.

A first advantageous effect is enabling optimization of distribution of consumption current inside submarine equipment and current passed to a Zener diode for each system specification, by transforming one kind of power supply circuit into a common platform even for various submarine cable systems having differing specifications of power feed current. A reason for this is that the number of cascade-connections of the Zener diodes ZD of the power supply circuit, and a path of a power feed line are automatically changed according to power consumption inside the submarine equipment.

A second advantageous effect is that development and manufacturing costs of submarine equipment can be reduced. A reason for this is that there is no longer a need to prepare an individual power supply circuit adapted to a specification of a submarine cable system, and lineup integration and consolidation of submarine equipment are enabled.

A third advantageous effect is that competitiveness or a competitive edge over a competing company can be maintained. A reason for this is that a cost increase resulting from customization is eliminated, a development lead time is shortened, and early inputting to a market is enabled.

Second Example Embodiment

Figure 2:
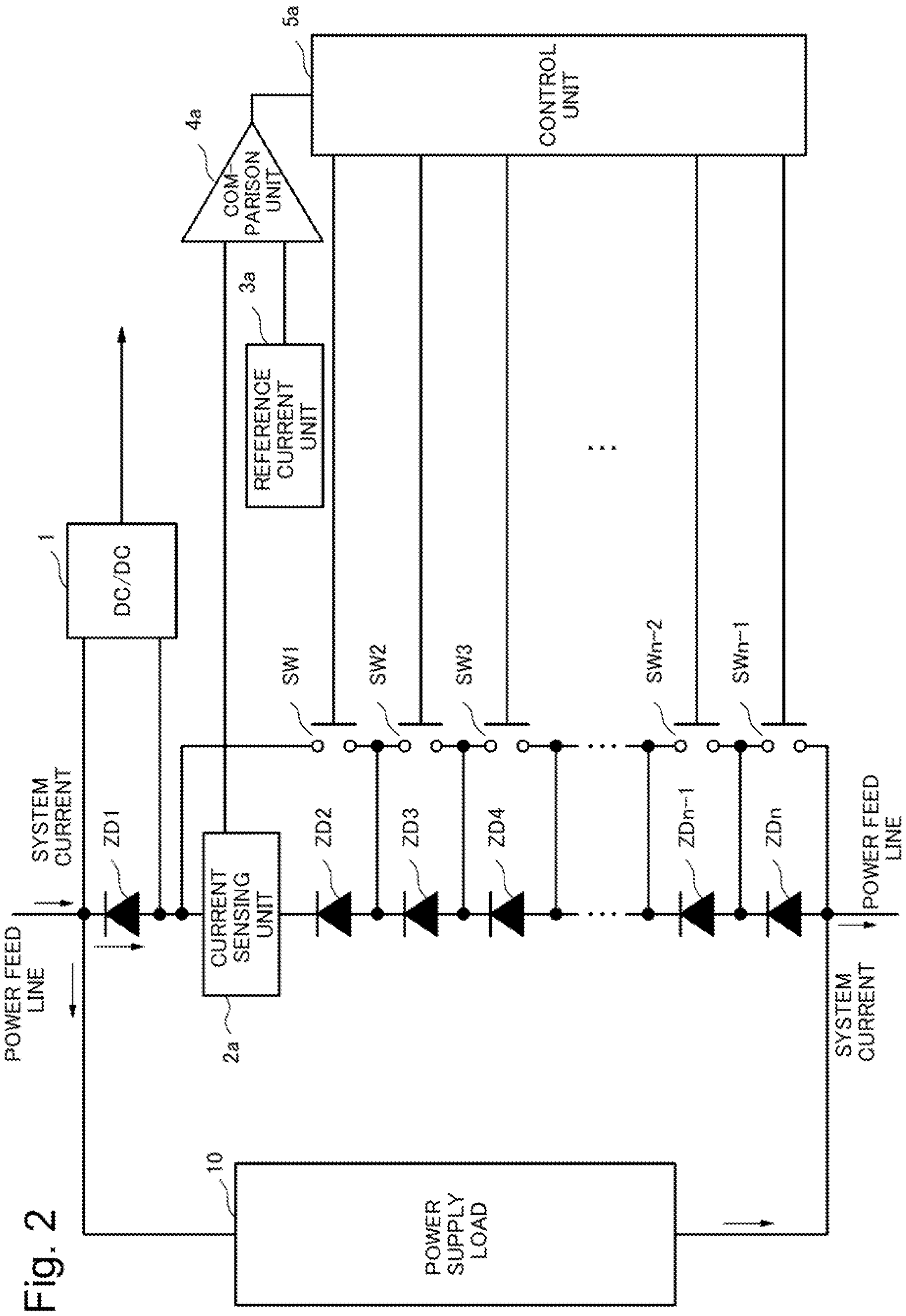
FIG. 2 is a circuit diagram of a power supply circuit according to a second example embodiment of the present invention.

Next, a power supply circuit, and a method for controlling a power supply circuit according to a second example embodiment of the present invention are described. FIG. 2 is a circuit diagram of a power supply circuit according to the second example embodiment of the present invention. The present example embodiment is a power supply circuit connected in parallel to a power supply load 10 to which power is supplied from a power feed line, as in the first example embodiment. Elements similar to those in the first example embodiment are assigned with the same reference signs, and detailed description thereof is omitted. The present example embodiment differs from the first example embodiment in connection of switches SW (SW1 to SWn−1) to cascade-connected Zener diodes ZD (ZD1 to ZDn), and a current path formed when the switches SW (SW1 to SWn−1) are turned on.

As in the first example embodiment, the power supply circuit in FIG. 2 includes a plurality of Zener diodes ZD (ZD1, ZD2, ZD3, ZD4, ZDn−1, and ZDn) that convert, into constant voltage, system current from the power feed line, and switches SW (SW1, SW2, SW3, . . . , SWn−2, and SWn−1) that are on/off-controlled. The plurality of Zener diodes ZD (ZD1, ZD2, ZD3, ZD4, . . . , ZDn−1, and ZDn) are cascade-connected, as in the first example embodiment. Herein, in the present example embodiment as well, n is an integer of 2 or more, and is not limited to the number of the Zener diodes ZD specifically illustrated as element symbols in FIG. 2, or the number of the switches SW specifically illustrated as element symbols in FIG. 2.

Further, the power supply circuit in FIG. 2 includes a current sensing unit 2*a* as one example of a current monitoring means for monitoring current flowing in one Zener diode among the plurality of Zener diodes ZD, a reference current unit 3*a*, and a comparison unit 4*a*. In the present example embodiment, the current sensing unit 2*a* is inserted on a cathode side of the Zener diode ZD2 in consideration of an on/off-controlling order, direction of the switch SW to be on/off-controlled, or the like. The reference current unit 3*a* converts, into voltage, a current value which is required for the power supply circuit in FIG. 2 and at which the Zener diode ZD can maintain breakdown voltage resulting from a Zener effect, and outputs the voltage to the comparison unit 4*a* as a threshold value. The comparison unit 4*a* compares the current monitored by the current sensing unit 2*a* with the threshold value from the reference current unit 3*a*, and controls a control unit 5*a* according to a comparison result.

The control unit 5*a* controls, based on the comparison result from the comparison unit 4*a*, the switches SW (SW1 to SWn−1) in such a way as to switch the number of cascade-connections of the Zener diodes ZD, and switches a current path where system current flows.

In the power supply circuit in FIG. 2, the switches SW (SW1, SW2, SW3, SWn−2, and SWn−1) are connected in parallel to one Zener diode among the plurality of Zener diodes ZD, and form a current path by being on-controlled. In the present example embodiment, for example, the switch SW1 is connected in parallel to the current sensing unit 2*a* and the Zener diode ZD2 that are series-connected. The switch SW2 is connected in parallel to the Zener diode ZD3, and the switch SW3 is connected in parallel to the Zener diode ZD4. Similarly, the switch SWn−1 is connected in parallel to the Zener diode ZDn, and a current path bypassing without going through the Zener diode ZDn−1 is formed by controlling the switch SWn−1 on.

Further, the power supply circuit in FIG. 2 includes a DC/DC converter 1, as in the first example embodiment. The DC/DC converter 1 generates voltage necessary for each component of submarine equipment, from breakdown voltage generated at both ends of the Zener diode ZD1 of the power feed line where system current flows.

In the power supply circuit in FIG. 2, n Zener diodes ZD are arranged in cascade in the power feed line where system current flows from a land power feed device. The power supply load 10, such as a control circuit of an optical amplifier and various function modules, is connected in parallel to the Zener diodes ZD.

(Description of Operation)

Next, an operation of the power supply circuit in FIG. 2, and a method for controlling a power supply circuit are described.

(Operation 1)

A case of such control as changing the number of cascade-connections by short-circuit removal of a Zener diode is first described. In this case of control, it is assumed that the plurality of switches SW (SW1 to SWn−1) of the power supply circuit in FIG. 2 are all on in an initial state.

The system current not only flows to the Zener diode ZD1 but also flows to the power supply load 10 side. When current flowing to the power supply load 10 side increases in such a case that power consumption on the power supply load 10 side becomes great, current flowing to the Zener diode ZD side drops to a current that is unable to maintain the breakdown voltage of the Zener diode ZD. In order to cope with this, in the power supply circuit in FIG. 2, the comparison unit 4*a* compares voltage of the current sensing unit 2*a* with voltage of the reference current unit 3*a*, and, when the voltage of the current sensing unit 2*a* becomes lower than the voltage of the reference current unit 3*a*, the control unit 5*a* controls in such a way as to switch the switch SWn−1 from on to off. In this instance, the control unit 5*a* maintains an on-state of the switches SW1 to SWn. This switches the number of cascades of the Zener diodes ZD to two. As a result, a current path going through the Zener diodes ZD1 and ZDn and further going through the switches SW1 to SWn−2 is formed. The voltage of the reference current unit 3*a* avoids becoming unable to maintain the breakdown voltage, with a threshold value being current slightly higher than a current that is unable to maintain the breakdown voltage of the Zener diode ZD. When the number of cascades of the Zener diodes ZD is switched to two, the power supply load 10 is given constant voltage resulting from breakdown voltage being associated with the number of cascades of the Zener diodes ZD, and current flows to the power supply load 10 side. Due to the flow of the current to the power supply load 10 side as well, power consumption on the power supply load 10 side increases, and accordingly, current flowing to the Zener diode ZD side drops to a current that is unable to maintain the breakdown voltage of the Zener diode ZD. In order to cope with this, the switch SWn−2 is further switched from on to off, and a current path going through the Zener diodes ZD1, ZDn−1, and ZDn−2 and further going through the switches SW1 to SWn−3 (not illustrated) is formed.

In this way, changing of the number of cascades of the Zener diodes ZD and switching of a path of a power feed line are repeated until voltage of the current sensing unit 2*a* becomes higher than voltage of the reference current unit 3*a*.

(Operation 2)

Next, a case of such control differing from that in Operation 1 described above, as changing the number of cascade-connections when system current is supplied from a power feed line, submarine equipment such as a power supply circuit operates, and power consumption thereof decreases is described. In this case, upper limit current is set in a reference value of the reference current unit 3*a*. In this case of control, it is assumed that the plurality of switches SW (SW1 to SWn−1) of the power supply circuit in FIG. 2 are all off in an initial state. In this instance, the number of cascades of the Zener diodes ZD is n.

System current is fed to the power supply circuit in FIG. 2 from a land power feed device, and the power supply circuit operates. The current sensing unit 2*a* of the power supply circuit monitors current flowing to the Zener diode ZD. The comparison unit 4*a* compares voltage of the current sensing unit 2*a* with voltage of the reference current unit 3*a*, and, when consumption current decreases, and the voltage of the current sensing unit 2*a* becomes higher than the voltage of the reference current unit 3*a*, the control unit 5*a* controls in such a way as to switch the switch SWn−1 from off to on. Thus, a current path going through the Zener diodes ZD1 to ZDn−1 and going through the switch SWn−1 is formed, and the number of cascades of the Zener diodes ZD is changed to n−1. In other words, the control unit 5*a* controls the switch SWn−1 in such a way that the number of cascades of the Zener diodes ZD is changed from n to n−1, and current from an anode of the Zener diode ZDn−1 is selected and output.

In this way, changing of the number of cascades of the Zener diodes ZD and switching of a path of a power feed line are repeated until voltage of the current sensing unit 2*a* becomes lower than voltage of the reference current unit 3*a*.

To summarize the above-described Operations 1 and 2 according to the present example embodiment, control according to the present example embodiment is to turn off the switches SW1, SW2, SW3, . . . , SWn−2, and SWn−1 in this order, i.e., open the switches, when increasing the number of cascades of the Zener diodes ZD. Further, control according to the present example embodiment is to turn on the switches SWn−1, SWn−2, . . . , SW3, SW2, and SW1 in this order, i.e., short-circuit the switches, when decreasing the number of cascades of the Zener diodes ZD.

(Description of Advantageous Effect) According to the present example embodiment, in submarine equipment constituting a submarine cable system, a configuration of a power supply circuit inside the submarine equipment can be automatically changed according to internal power consumption of the submarine equipment, as in the above-described first example embodiment. Current flowing to the cascade-connected Zener diodes ZD of the power supply circuit is monitored, and a current path is changed based on a monitoring result in such a way that the number of cascades of the cascade-connected Zener diodes ZD becomes a changed number. This can solve such a problem that current of surplus power for a power feed ability all flows to the Zener diode ZD, and leads to excessive heat generation of the Zener diode ZD.

Furthermore, in the present example embodiment, a connection form of the switches SW (SW1 to SWn−1) to the cascade-connected Zener diodes ZD (ZD1 to ZDn) is changed, and a current path formed when the switch is on-controlled is changed. Thus, while the selector 6 according to the first example embodiment is omitted, the configuration of the power supply circuit inside the submarine equipment can be automatically changed according to internal power consumption of the submarine equipment.

Third Example Embodiment

Figure 3:
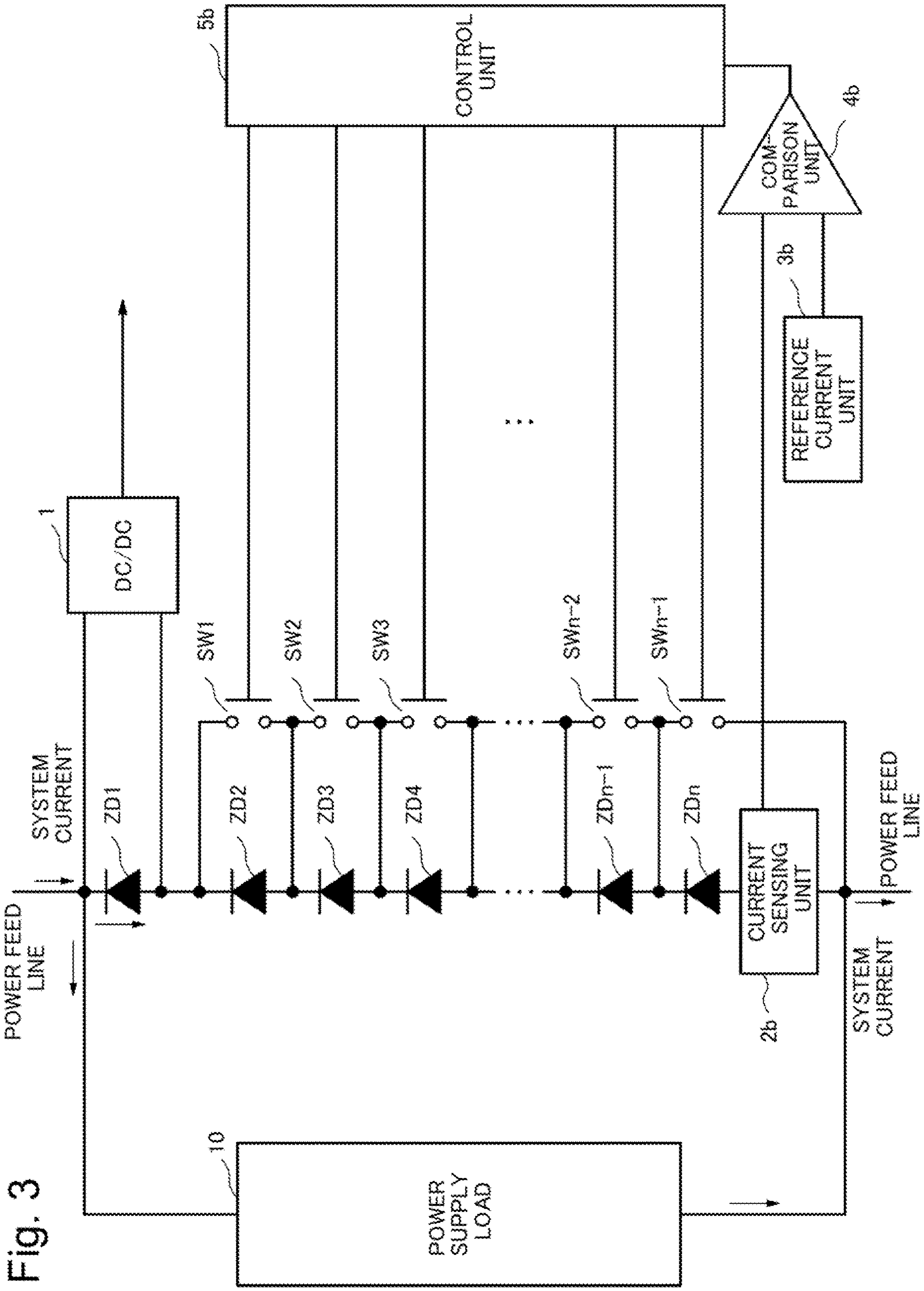
FIG. 3 is a circuit diagram of a power supply circuit according to a third example embodiment of the present invention.
Figure 4:
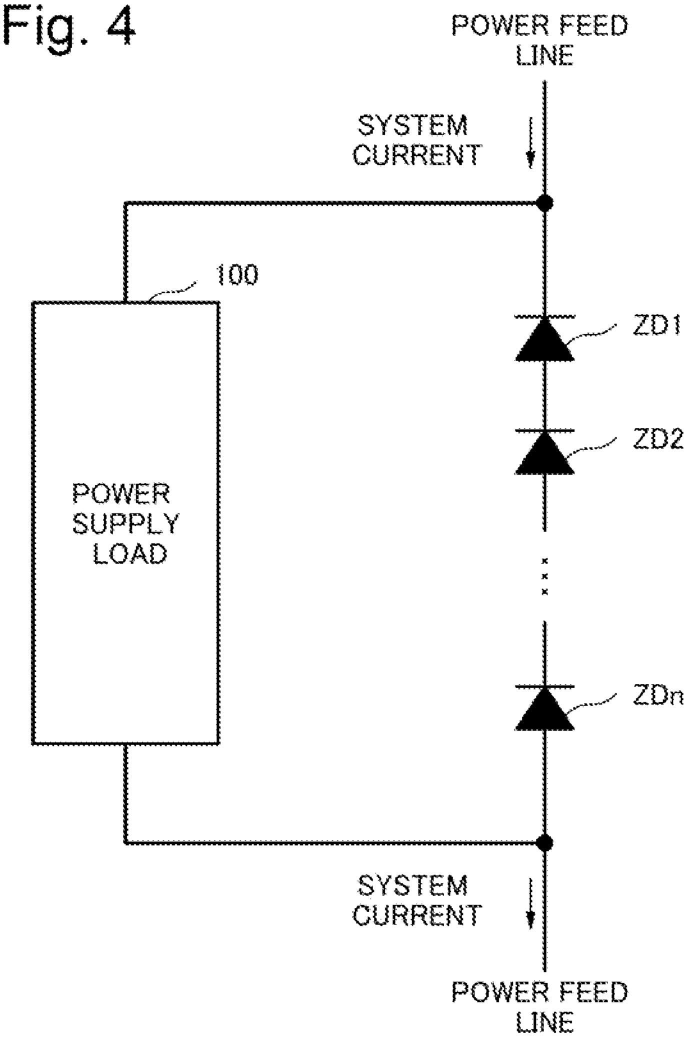
FIG. 4 is a circuit diagram of a power supply circuit according to a background art.

Next, a power supply circuit, and a method for controlling a power supply circuit according to a third example embodiment of the present invention are described. FIG. 3 is a circuit diagram of a power supply circuit according to the third example embodiment of the present invention. The present example embodiment is a power supply circuit connected in parallel to a power supply load 10 to which power is supplied from a power feed line, as in the first and second example embodiments. Elements similar to those according to the above-described example embodiments are assigned with the same reference signs, and detailed description thereof is omitted. The present example embodiment is a modification example of the second example embodiment.

As in the first and second example embodiments, the power supply circuit in FIG. 3 includes a plurality of Zener diodes ZD (ZD1, ZD2, ZD3, ZD4, ZDn−1, and ZDn) that convert, into constant voltage, system current from the power feed line, and switches SW (SW1, SW2, SW3, . . . , SWn−2, and SWn−1) that are on/off-controlled. The plurality of Zener diodes ZD (ZD1, ZD2, ZD3, ZD4, . . . , ZDn−1, and ZDn) are cascade-connected, as in the first and second example embodiments. Herein, in the present example embodiment as well, n is an integer of 2 or more, and is not limited to the number of the Zener diodes ZD specifically illustrated as element symbols in FIG. 3, or the number of the switches SW specifically illustrated as element symbols in FIG. 3.

Further, the power supply circuit in FIG. 3 includes a current sensing unit 2*b* as one example of a current monitoring means for monitoring current flowing in one Zener diode among the plurality of Zener diodes ZD, a reference current unit 3*b*, and a comparison unit 4*b*. In the present example embodiment, the current sensing unit 2*b* is inserted on an anode side of the Zener diode ZDn in consideration of an on/off-controlling order or direction of the switch SW to be on/off-controlled. The reference current unit 3*b* converts, into voltage, a current value which is required for the power supply circuit in FIG. 3 and at which the Zener diode ZD can maintain breakdown voltage resulting from a Zener effect, and outputs the voltage to the comparison unit 4*b* as a threshold value. The comparison unit 4*b* compares the current monitored by the current sensing unit 2*b* with the threshold value from the reference current unit 3*b*, and controls a control unit 5*b* according to a comparison result.

The control unit 5*b* controls, based on the comparison result from the comparison unit 4*b*, the switches SW (SW1 to SWn−1) in such a way as to switch the number of cascade-connections of the Zener diodes ZD, and switches a current path where system current flows.

In the power supply circuit in FIG. 3, the switches SW (SW1, SW2, SW3, . . . , SWn−2, and SWn−1) are connected in parallel to one Zener diode among the plurality of Zener diodes ZD, and form a current path by being on-controlled. In the present example embodiment, for example, the switch SWn−1 is connected in parallel to the Zener diode ZDn and the current sensing unit 2*b* that are series-connected. The switch SWn−2 is connected in parallel to the Zener diode ZDn−1, and the switch SW3 is connected in parallel to the Zener diode ZD4. Similarly, the switch SW1 is connected in parallel to the Zener diode ZD2, and a current path bypassing without going through the Zener diode ZD2 is formed by controlling the switch SW1 on.

Further, the power supply circuit in FIG. 3 includes a DC/DC converter 1, as in the first and second example embodiments. The DC/DC converter 1 generates voltage necessary for each component of submarine equipment, from breakdown voltage generated at both ends of the Zener diode ZD1 of the power feed line where system current flows.

In the power supply circuit in FIG. 3, n Zener diodes ZD are arranged in cascade in the power feed line where system current flows from a land power feed device. The power supply load 10, such as a control circuit of an optical amplifier and various function modules, is connected in parallel to the Zener diodes ZD.

(Description of Operation)

Next, an operation of the power supply circuit in FIG. 3, and a method for controlling a power supply circuit are described.

(Operation 1)

A case of such control as changing the number of cascade-connections by short-circuit removal of a Zener diode is first described. In this case of control, it is assumed that the plurality of switches SW (SW1 to SWn−1) of the power supply circuit in FIG. 3 are all on in an initial state.

System current not only flows to the Zener diode ZD1 but also flows to the power supply load 10 side. When current flowing to the power supply load 10 side increases in such a case that power consumption on the power supply load 10 side becomes great, current flowing to the Zener diode ZD side drops to a current that is unable to maintain the breakdown voltage of the Zener diode ZD. In order to cope with this, in the power supply circuit in FIG. 3, the comparison unit 4*b* compares voltage of the current sensing unit 2*b* with voltage of the reference current unit 3*b*, and, when the voltage of the current sensing unit 2*b* becomes lower than the voltage of the reference current unit 3*b*, the control unit 5*b* controls in such a way as to switch the switch SW1 from on to off. In this instance, the control unit 5*b* maintains an on-state of the switches SW2 to SWn−1. This switches the number of cascades of the Zener diodes ZD to two. As a result, a current path going through the Zener diodes ZD1 and ZD2 and further going through the switches SW2 to SWn−1 is formed. The voltage of the reference current unit 3*b* avoids becoming unable to maintain the breakdown voltage, with a threshold value being current slightly higher than a current that is unable to maintain the breakdown voltage of the Zener diode ZD. When the number of cascades of the Zener diodes ZD is switched to two, the power supply load 10 is given constant voltage resulting from breakdown voltage being associated with the number of cascades of the Zener diodes ZD, and current flows to the power supply load 10 side. Due to the flow of the current to the power supply load 10 side as well, power consumption on the power supply load 10 side increases, and accordingly, current flowing to the Zener diode ZD side drops to a current that is unable to maintain the breakdown voltage of the Zener diode ZD. In order to cope with this, the switch SW2 is further switched from on to off, and a current path going through the Zener diodes ZD1, ZD2, and ZD3 and further going through the switches SW3 to SWn−1 is formed.

In this way, changing of the number of cascades of the Zener diodes ZD and switching of a path of a power feed line are repeated until voltage of the current sensing unit 2*b* becomes higher than voltage of the reference current unit 3*b*.

(Operation 2)

Next, a case of such control differing from that in Operation 1 described above, as changing the number of cascade-connections when system current is supplied from a power feed line, submarine equipment such as a power supply circuit operates, and power consumption thereof decreases is described. In this case, upper limit current is set in a reference value of the reference current unit 3*b*. In this case of control, it is assumed that the plurality of switches SW (SW1 to SWn−1) of the power supply circuit in FIG. 3 are all off in an initial state. In this instance, the number of cascades of the Zener diodes ZD is n.

System current is fed to the power supply circuit in FIG. 3 from a land power feed device, and the power supply circuit operates. The current sensing unit 2*b* of the power supply circuit monitors current flowing to the Zener diode ZD. The comparison unit 4*b* compares voltage of the current sensing unit 2*b* with voltage of the reference current unit 3*b*, and, when consumption current decreases, and the voltage of the current sensing unit 2*b* becomes higher than the voltage of the reference current unit 3*b*, the control unit 5*b* controls in such a way as to switch the switch SW1 from off to on. Thus, a current path going through the Zener diodes ZD1 and ZD3 to ZDn−1 and going through the switch SW1 is formed, and the number of cascades of the Zener diodes ZD is changed to n−1. In other words, the control unit 5*b* controls the switch SW1 in such a way that the number of cascades of the Zener diodes ZD is changed from n to n−1, and a current path bypassing without going through the Zener diode ZD2 is selected and output.

In this way, changing of the number of cascades of the Zener diodes ZD and switching of a path of a power feed line are repeated until voltage of the current sensing unit 2*b* becomes lower than voltage of the reference current unit 3*b*.

To summarize the above-described Operations 1 and 2 according to the present example embodiment, control according to the present example embodiment is to turn off the switches SWn−1, SWn−2, . . . , SW3, SW2, and SW1 in this order, i.e., open the switches, when increasing the number of cascades of the Zener diodes ZD. Further, control according to the present example embodiment is to turn on the switches SW1, SW2, SW3, . . . , SWn−2, and SWn−1 in this order, i.e., short-circuit the switches, when decreasing the number of cascades of the Zener diodes ZD.

Description of Advantageous Effect

According to the present example embodiment, in submarine equipment constituting a submarine cable system, a configuration of a power supply circuit inside the submarine equipment can be automatically changed according to internal power consumption of the submarine equipment, as in the above-described first and second example embodiments. Current flowing to the cascade-connected Zener diodes ZD of the power supply circuit is monitored, and a current path is changed based on a monitoring result in such a way that the number of cascades of the cascade-connected Zener diodes ZD becomes a changed number. This can solve such a problem that current of surplus power for a power feed ability all flows to the Zener diode ZD, and leads to excessive heat generation of the Zener diode ZD.

Furthermore, in the present example embodiment, a connection form of the switches SW (SW1 to SWn−1) to the cascade-connected Zener diodes ZD (ZD1 to ZDn) is changed, and a current path formed when the switch is on-controlled is changed, as in the second example embodiment. Thus, while the selector 6 according to the first example embodiment is omitted, the configuration of the power supply circuit inside the submarine equipment can be automatically changed according to internal power consumption of the submarine equipment, as in the second example embodiment.

Other Example Embodiments

While the present invention has been described above with several example embodiments, the present invention is not limited thereto. For example, the power supply load 10 according to the example embodiment can be constituted of a control circuit of an optical amplifier in submarine equipment of a submarine cable system, and various function modules. As in FIG. 1 of PTL1, a configuration including a voltage changer and a DC/DC converter can be formed. A plurality of configurations each being constituted of a voltage changer and a DC/DC converter may be included. The DC/DC converter 1 in each of FIGS. 1 to 3 can generate power to be supplied to a module that always needs to be driven in order for the power supply circuit according to the example embodiment to operate, such as the comparison unit, the control unit, and the selector in the power supply circuit according to the example embodiment. It can also be considered that a current monitoring means for monitoring current flowing in a Zener diode is omitted when control that increases the number of cascades of Zener diodes in a steady state determined by a relation with specification power supply voltage of the power supply load 10 can be assumed from breakdown voltage of the Zener diode and this number of cascades, at application of operation power to the power supply load 10 or the like.

While the invention has been particularly shown and described with reference to exemplary embodiments thereof, the invention is not limited to these embodiments. For example, such an arrangement can be considered that the current sensing unit 2 of the power supply circuit in FIG. 1 according to the first example embodiment is inserted on an output side of the selector 6, and output current of the selector 6 is monitored. Specifically, it will be understood by those of ordinary skill in the art that various changes in form and details may be made therein without departing from the spirit and scope of the present invention as defined by the claims.

This application is based upon and claims the benefit of priority from Japanese patent application No. 2019-25084, filed on Feb. 15, 2019, the disclosure of which is incorporated herein in its entirety by reference.

REFERENCE SIGNS LIST

1 DC/DC converter
2, 2*a*, 2*b* Current sensing unit
3, 3*a*, 3*b* Reference current unit
4, 4*a*, 4*b* Comparison unit
5, 5*a*, 5*b* Control unit
6 Selector
10 Power supply load

What is claimed is:

1. A power supply circuit comprising:

a plurality of cascade-connected Zener diodes being connected in parallel to a load to which power is supplied from a power feed line;

a switch that is on/off-controlled, is connected between the plurality of Zener diodes or in parallel to a first one Zener diode among the plurality of Zener diodes, and forms a current path by being on-controlled;

a current monitoring unit that monitors current flowing in a second one Zener diode among the plurality of Zener diodes;

a comparison unit that compares reference current with the current monitored by the current monitoring unit; and a control unit that on/off-controls the switch, based on a result of the comparison by the comparison unit.

2. The power supply circuit according to claim 1, wherein the current monitoring unit is connected in series to the plurality of Zener diodes being connected in parallel to the load.

3. The power supply circuit according to claim 1, wherein the comparison unit compares a voltage value of the current monitoring unit with a voltage value corresponding to the reference current, and outputs a result of the comparison.

4. The power supply circuit according to claim 1, further comprising a selector that selects a connection point between a third one Zener diode and an adjacent Zener diode, and a connection point between a Zener diode different from the third one Zener diode and an adjacent Zener diode, among the plurality of cascade-connected Zener diodes, and switches, based on a comparison result of the comparison unit, a changed current path of a plurality of Zener diodes being connected in parallel to the load.

5. The power supply circuit according to claim 1, wherein the switch includes a first switch and a second switch, the plurality of cascade-connected Zener diodes include a first Zener diode, a second Zener diode, and a third Zener diode, the first switch is connected between the first Zener diode and the second Zener diode, and the second switch is connected between the second Zener diode and the third Zener diode.

6. The power supply circuit according to claim 1, wherein the switch includes a first switch and a second switch, the plurality of cascade-connected Zener diodes include a first Zener diode and a second Zener diode, the first switch is connected in parallel to the first Zener diode and the current monitoring unit that are series-connected, and the second switch is connected in parallel to the second Zener diode.

7. A method for controlling a power supply circuit including a plurality of cascade-connected Zener diodes being connected in parallel to a load to which power is supplied from a power feed line, and a switch that is on/off-controlled, is connected between the plurality of Zener diodes or in parallel to a first one Zener diode among the plurality of Zener diodes, and forms a current path by being on-controlled, the method comprising:

monitoring current flowing in a second one Zener diode among the plurality of Zener diodes; and comparing reference current with the monitored current, and on/off-controlling the switch, based on a result of the comparison.

8. The method for controlling the power supply circuit according to claim 7, further comprising selecting a connection point between a third one Zener diode and an adjacent Zener diode, and a connection point between a Zener diode different from the third one Zener diode and an adjacent Zener diode, among the plurality of cascade-connected Zener diodes, and switching a changed current path of a plurality of Zener diodes being connected in parallel to the load.

9. The method for controlling the power supply circuit according to claim 7, wherein the switch includes a first switch and a second switch, the plurality of cascade-connected Zener diodes include a first Zener diode, a second Zener diode, and a third Zener diode, the first switch is connected between the first Zener diode and the second Zener diode, and the second switch is connected between the second Zener diode and the third Zener diode.

10. The method for controlling the power supply circuit according to claim 7, wherein the switch includes a first switch and a second switch, the plurality of cascade-connected Zener diodes include a first Zener diode and a second Zener diode, the first switch is connected in parallel to a current monitoring unit that monitors current flowing in the first Zener diode and a fourth one Zener diode among the plurality of Zener diodes, that are series-connected, and the second switch is connected in parallel to the second Zener diode.

* * * * *